United States Patent Office 3,556,698
Patented Jan. 19, 1971

3,556,698
PROCESS FOR BURNING OIL SPILLS
Paul R. Tully, Lowel, William J. Fletcher, Saugus, and Hector Cochrane, Groveland, Mass., assignors to Cabot Corporation, Boston, Mass., a corporation of Delaware
No Drawing. Continuation-in-part of application Ser. No. 788,331, Dec. 31, 1968. This application Nov. 18, 1969, Ser. No. 877,826
Int. Cl. F23d 21/00
U.S. Cl. 431—2          14 Claims

ABSTRACT OF THE DISCLOSURE

The present invention provides an improved method for the elimination of water and land borne spills by burning. Broadly, certain particulate solids are applied to the spill and the resulting system is thereafter fired. Such treated spills are more easily ignited and the combustion thereof is more complete than experienced with untreated spills. When certain conditions pertaining to the type and amount of treating agent applied to the spill are met even further benefits accrue to the process of the invention. Said benefits reside in improved physical character of the burned residue which is more amenable to physical removal thereof from the water or land mass than the burned residuum of untreated spills.

CROSS REFERENCE

This application is a continuation-in-part of copending U.S. Ser. No. 788,331, filed Dec. 31, 1968, and now abandoned.

THE PRIOR ART

In March of 1967 an event occurred which has spurred intensive world wide research efforts directed towards solution of the problem of removal of oil spills from the surface of water. Said event was the infamous *Torrey Canyon* disaster in which a heavily oil laden tanker ran aground off the southwest coast of England, split open and poured about 850,000 barrels of crude oil onto the open sea. Despite intensive and varied removal efforts of several private and governmental agencies large quantities of the oil spill from the stricken tanker eventually washed ashore on Cornwall and Brittany. The resulting pollution of the land mass has had and will continue to have widespread and long term serious deterimental effects on the wildlife, ecology and economy of the afflicted area.

Accordingly, in direct response to the above and subsequent disasters of this type, there has been an intense focusing of interest on providing suitable remedies for accidental oil spills. To date, two broad general methods have achieved some degree of success. First, physical absorption techniques have been developed which rely essentially upon the absorption of the oil spill by an absorbent material. Thus, clays, expanded micas, diatomaceous earth, talcs and the like are applied to the spill, the oil is absorbed by the solid material and the resulting mass is then physically removed or allowed by design to settle to the bottom of the body of water. In some processes of these type, the absorbent material is pretreated so as to render it more susceptible of wetting by the oil. Such oil removal methods suffer several disadvantages. First, the amount of solid material required to be applied to the oil spill is generally inordinately high; for instance, it is not uncommon to utilize from 20 to about 50 or more percent by weight of the oil spill of the absorbent material. Secondly, the application of such absorbent materials to the oil spill, even in the relatively enormous quantities contemplated, does not usually confer sufficient physical integrity to the treated oil spill to render a subsequent physical removal step as an attractive method of removal. Thus, oil spills which are treated with large amounts of absorbent clays, etc., if buoyant at all, are normally of such weak physical character as to be essentially only impractically susceptible of pumping, skimming, screening, etc. methods of physical removal. Conversely, when such water borne treated slicks are allowed to sink to the bottom of the water mass, the eventual removal thereof is dependent almost entirely upon biodegradation processes and/or the dispersing action of waves, tides and ocean currents. Clearly, therefore, this latter aspect of the absorbent treatment method represents, at best, a long term solution in which considerable potential exists for relatively immediate severe damage to the marine ecology prior to the eventual removal of the slick.

An alternate method to the aforedescribed absorbent treatment has been investigated and appears to hold some promise. Said method depends upon the treatment of the oil slick with a dispersing agent, such as an emulsifier or surfactant. Said method depends upon the action of the dispersant material to fracture the oil slick into relatively small globules which then sink and/or are carried from the main body of the oil slick by wave or tide action. The dispersed globules of oil are then biodegraded or so well distributed throughout the water mass as to cause little or no practical concern. This second avenue of attack, however, also suffers from the problem that many presently known effective dispersant materials are also often detrimental to various of the many forms of wildlife indigenous to a marine environment. Furthermore, emulsified oil slicks can constitute an even greater overall hazard than untreated slicks when washed ashore because the emulsified oils are inordinately difficult to eliminate from the land mass. Clearly, the ultimate solution to the oil spill problem resides in substantially total removal of the oil from the afflicted body rather than mere dispersal thereof.

OBJECTS OF THE INVENTION

In accordance with the present invention, therefore, it is a principal object to provide an effective process for the burning of oil slicks, spills and the like.

It is another object of the present invention to provide a process for burning oil spills which process is characterized by the improved efficiency of the combustion of the spill.

It is another object of the present invention to provide a process for burning oil spills in which the oil spill is rendered more readily ignitable by treatment thereof prior to ignition.

It is still another object of the present invention to provide a process for burning oil spills in which the residuum of the burning process is of improved physical integrity and more readily removable from the afflicted water or land mass.

Other objects and advantages of the present invention will in part be obvious and will in part appear hereinafter.

SUMMARY OF THE INVENTION

With respect to the foregoing objects and advantages of the invention, it has been discovered that oil spills, slicks, and the like can be more readily ignited and burned with improved efficiency when there is applied to the oil spill, prior to the firing thereof, certain particulate solids. When preferred amounts of such particulate solids are utilized, further benefits are provided in improved physical character of the burned residuum which renders said residuum more easily removable by physical methods.

DETAILED DESCRIPTION OF THE INVENTION

During the course of the many and varied attempts to solve the aforementioned oil spill problem resulting from the *Torrey Canyon* disaster many attempts were made to fire the oil slick. However, said attempts, even though they involved such strenuous measures as napalm and thermite bombing, failed to produce a burning oil mass the combustion of which was self-propagating. Accordingly, even though ignition of the crude oil spill was achieved with great difficulty, the resulting fire soon decayed and self-extinguished. This, however, is not particularly surprising in view of the fact that heavy oils, such as crude or fuel oils of grade Nos. 2 through 6 normally have flash points exceeding about 100° F. and viscosities of greater than about 5.8 centistokes at 100° F. In fact, fuel oils Nos. 5 and 6 are normally solids or semi-solids at room temperatures. The above considerations, coupled with the obvious fact that the relatively enormous cool water mass residing beneath the oil slick acted as an essentially limitless heat sink and thus prevented the substantial warming of the oil by combustion, clearly mitigated greatly against the effectiveness of burning as a practical expedient for the removal of the *Torrey Canyon* oil spill.

In accordance with our invention we have now found that the ignition of water or land-borne oil spills is markedly eased when, prior to ignition, the spill is treated with at least about 0.01 percent by weight thereof of certain finely-divided particulate solids. Additionally, we have found that when the spill is treated with at least about 0.5 weight percent thereof of such finely divided solids the extent of burning thereof, subsequent to ignition, is substantially greater than that of the untreated slick.

The particulate solid materials useful as the treating agents of the present invention are generally any substantially hydrocarbon and water insoluble particulate solid having an average ultimate particle diameter of less than about 250 m$\mu$ (preferably less than about 100 m$\mu$), an apparent density of less than about 50 lb./ft.$^3$ (preferably less than about 15 lb./ft.$^3$) and a specific surface area (as determined by the BET-N$_2$ method) of greater than about 10 m.$^2$/gram (preferably greater than about 50 m.$^2$/gm.). Specific examples of such materials are: carbons such as carbon black, activated carbons, chars and the like; metal and metalloid oxides produced by way of various precipitation, arc, plasma or pyrogenic processes such as silica, titania, alumina, silica-alumina, silica gel, alumina gel, iron oxide, zirconia, vanadia, chromia, magnesia, zinc oxide, copper oxides, and the like. In addition, there exist various naturally occurring siliceous clays and minerals such as chryostile asbestos which can be specifically treated so as to fall within the ambit of the above-recited solubility, particle diameter, density and surface area criteria. Certain of such naturally occurring materials, in particular, asbestos, are usually acicular, lamellar or fibrous in form rather than roughly spherical. However, for the purposes of the present invention, such acicular or fibrous materials are to be considered as meeting the particle diameter criteria set forth hereinabove when the average cross-sectional dimension of the ultimate particle thereof is less than about 250 m$\mu$.

Additionally, particularly when it is desired that a substantial amount of physical integrity be imparted to the combusted residuum resulting from the firing of the treated oil spills of the invention, it is preferred that the particulate solid utilized be possessed of a substantial degree of "structure."

"Structure" is that property of a particulate solid which signifies the extent to which primary particles thereof tend to form into a chainlike network. Accordingly, the higher the "structure" of a particulate solid, all other factors being equal, the greater the reinforcement capabilities thereof will normally be when dispersed into a suitable matrix. Generally, the "structure" of a particulate solid is roughly proportional to the ability of the solid to absorb oils, such as linseed or mineral oil or dibutylphthalate. In the present specification and the claims forming part hereof, the term "oil absorption factor" is to be considered as the minimum amount of dibutylphthalate (in ccs.) required to cause the coalescence of 100 grams of a given particulate solid into single spherical structure by working incremental amounts of the oil into the solid by means of hand stirring with a spatula. Thus, for the purposes of the present invention, those particulate solids which, in addition to meeting the limitations previously set forth, also bear oil absorption factors of greater than about 100 ccs./100 grams of solid are normally greatly to be preferred. Further, when such preferred solids are utilized, it is advantageous in terms of eliciting the maximum reinforcing function in the burned oil slick residuum, to treat the oil slick with at least about 2 percent by weight thereof of the highly structured particulate solid and even more preferably with between about 4 and about 10% by weight thereof.

In the practice of the most preferred method of the invention, the particulate solids utilized are also rendered hydrophobic prior to application thereof to the oil spill. When such particulate solids are utilized, potential loss of the solid material into the water phase is normally vastly lessened. In fact, water may be effectively utilized as a carrier liquid for the conveyance of such hydrophobic particulate solids to the oil slick. In particular, metal and metalloid oxides, such as silica or titania, which have been rendered hydrophobic by treatment thereof with various organosilicon compounds have been found to be especially preferred treating agents.

The application of the treating agents of the present invention to the oil spill may be undertaken in any suitable manner. For instance, the particulate solids may be applied by hand, by air drops, or other procedures well known to the particulate material application arts. When, however, the much preferred hydrophobic particulate solids are utilized the application to water-borne spills can be made advantageously either from beneath or above the surface of the spill. A water stream can be utilized (in accordance with the well known Bernoulli pump principles) to aspirate the hydrophobic solid from its storage area and convey same to the spill. When this stream is played upon the upper surface of the slick the water carrier sinks therethrough leaving, however, the preponderance of the hydrophobic particulate solid in or on said slick.

Further, again referring to water-borne spills, the hydrophobic solids can be conveyed into the water phase from beneath the oil slick and thereafter released. Due to the hydrophobic/olephilic nature of the particulate solid said solid rises to the oil/water interface and is entrained substantially entirely into the slick proper. Where air or other gas is also entrained in this subsurface application method, said gas tends to rise through the slick, thus providing an additional mild and often desirable dispersing function. Additional benefits to be derived from the use of hydrophobic particulate solids and application thereof to the oil slick from beneath the water surface also reside in the substantial obviation of potential losses of said materials due to convection, breezes, wind gusts, etc. which are often encountered in the environment above the surface of the slick as well as providing improved capability of precision and uniformity of application.

Subsequent to the application of the treating agents of the invention to the oil spill, the resulting oil/solid system is ignited in any suitable manner. We have found, for instance, that such ignition may be expeditiously achieved by applying to a localized area of the treated slick a small amount of a highly flammable liquid, such as lighter fluid, kerosene, or the like and igniting this so-called "initiator." The resulting flame thereafter progresses into the treated slick proper and propogates across the surface of the oil/solid system. Obviously, however, any other suitable method which achieves ignition of the oil/solid system is satisfactory. It should be noted that yet another advantage is often provided by the practice of our invention. Said advantage resides in the ability to often burn oil spills selectively. We have found, particularly in dealing with heavy, high viscosity oils (Nos. 4 through 6), that normally only those portions of the spill which have been treated with the particulate solid can be combusted. Thus, if desired, the present invention may be employed to burn such spills in a piecemeal, controllable manner.

There follow illustrative non-limiting examples.

EXAMPLE 1

In seas running to about six foot swells with about a one foot chop and a temperature of about 50° F. and under gusty wind conditions of about 15–25 knots, there were placed 27 free-floating rings of about six foot diameter each. Said rings extended about 6 inches above and about 3 inches below the standing water surface. Into each of 9 of said rings there was charged about 50 gallons of No. 2 fuel oil. Into each of an additional 9 of said rings there was charged about 50 gallons of No. 4 fuel oil. Into the remaining 9 rings there was charged 50 gallons of crude oil (No. 6). The weight of oil charged into each of said rings was about 350 lbs. based on the densities of said oils of about 7 lbs./gallon. In three of the rings containing each of the various oils no treatment was accomplished (Series 1). Into a second series of 3 rings there was applied to the surface of the oil by hand about 7 lbs. of Cab-O-Sil M-5, an untreated pyrogenic silica produced by Cabot Corporation having an average ultimate particle diameter of about 15 millimicrons, a BET-$N_2$ surface area of about 200 m.$^2$/gram and an apparent density of about 2 lbs./ft.$^3$ (Series 2). The oil absorption factor of said silica was about 225 ccs./100 grams.

To the surfaces of each of third group of rings (Series 3) there was applied about 0.17 lb. of the same type of silica utilized in Series 2, representing, therefore, a treatment level of about 0.05% by weight of the oil.

To the surfaces of each of a fourth group of rings (Series 4) containing the several oils there was applied about 7 lbs. each of Avibest-C, a defibrillated chrysotile produced by F.M.C. Corporation having an average ultimate fibril diameter of less than about 20 millimicrons, a BET-$N_2$ surface area of about 70 m.$^2$/gram and an apparent density of about 6 lbs./ft.$^3$.

To the fifth series of the ringed oil slicks there was charged about 7 lbs. each of a channel type carbon black having an average ultimate particle diameter of about 14 millimicrons, a BET-$N_2$ surface area of about 400 m.$^2$/gram and an apparent density of about 8 lbs./ft.$^3$. In each of the foregoing Series 2–5, the hand application of the solid treating agent was hindered by entrainment and blowing of said solids by the wind. The oil absorption factor of said carbon black was about 150 ccs./gram.

To the sixth group of oil slick containing rings, there was charged about 7 lbs. each of the silica of the type utilized in Series 2 and 3 which had additionally been treated by reaction thereof with an organosilicon compound thus rendering said silica hydrophobic. A Bernoulli pump was operated utilizing sea water as the transport fluid and the silica was aspirated from bagged quantities thereof. The resulting sea water/silica efflux was pumped beneath the surface of each of the three ringed slicks and it was noted that several bubbles broke through the surface of the oil slicks, said bubbles bearing a substantial amount of the hydrophobic silica, the preponderance of which deposited on the upper surface of the slicks.

In the seventh series of rings there was applied about 25 lbs. each of the silica utilized in Series 6 in the same manner therein. Said method of application was accomplished readily with no substantial loss of the treating agent due to dusting, blowing, etc.

In the eighth series of ring entrained slicks, there was charged by hand about 7 lbs. each of a pigment grade titanium dioxide having an average particle diameter of about 300 m$\mu$, a BET-$N_2$ surface area of about 10 m.$^2$/gram and an apparent density of about 50 lbs./ft.$^3$. The oil absorption factor of said titanium dioxide pigment was about 30 ccs./gram.

In the ninth series of oil slicks there was applied by hand about 3 lbs. each of a pyrogenic titanium dioxide having an average particle diameter of about 20 millimicrons, a BET-$N_2$ surface area of about 50 m.$^2$/gram and an apparent density of about 4 lbs./ft.$^3$. The oil absorption factor of said pyrogenic titania was about 30 ccs./gram.

Next, each of the oil slicks was ignited or attempted to be ignited by pouring about one pint of lighter fluid onto the surface of a localized area of each oil slicks and substantially immediately thereafter igniting the thusly deposited fluid.

Subsequent to the combustion step the contents of each ring were examined for thickness and consistency. A tabulation of the results of these tests as well as the experienced firing qualities of the various oil slicks contained within the rings are set forth in the table following:

TABLE I

| Oil Number | Ignition properties [a] | Burning qualities [b] | Thickness burned (percent) | Physical character of burned residuum [c] |
|---|---|---|---|---|
| Series 1 (untreated): | | | | |
| 2 | 1 | 1 | 0 | 1 |
| 4 | 1 | 1 | 0 | 1 |
| 6 | 1 | 1 | 0 | 1 |
| Series 2 (silica) 2% by wt.: | | | | |
| 2 | 10 | 10 | 90 | 7 |
| 4 | 8 | 9 | 85 | 7 |
| 6 | 6 | 8 | 80 | 7 |
| Series 3 (silica) 0.05% by wt.: | | | | |
| 2 | 10 | 3 | 10 | 1 |
| 4 | 8 | 2 | 10 | 1 |
| 6 | 6 | 2 | 30 | 1 |
| Series 4 (asbestos) 2% by wt.: | | | | |
| 2 | 3 | 3 | 10 | 2 |
| 4 | 7 | 8 | 80 | 7 |
| 6 | 6 | 7 | 80 | 7 |
| Series 5 (carbon black) 2% by wt.: | | | | |
| 2 | 3 | 2 | 10 | 1 |
| 4 | 7 | 6 | 40 | 4 |
| 6 | 6 | 5 | 45 | 4 |
| Series 6 (silica, hydrophobic) 2% by wt.: | | | | |
| 2 | 10 | 10 | 90 | 7 |
| 4 | 8 | 9 | 85 | 7 |
| 6 | 6 | 8 | 80 | 7 |
| Series 7 (silica, hydrophobic) 7% by wt.: | | | | |
| 2 | 10 | 10 | 90 | 10 |
| 4 | 8 | 9 | 85 | 9 |
| 6 | 7 | 8 | 80 | 9 |
| Series 8 (TiO$_2$, 300 m$\mu$ pigment): | | | | |
| 2 | 1 | 1 | 0 | 1 |
| 4 | 1 | 1 | 0 | 1 |
| 6 | 2 | 2 | 10 | 1 |
| Series 9 (TiO$_2$, non-pigment 30 $\mu$) | | | | |
| 2 | 1 | 1 | 0 | 1 |
| 4 | 5 | 4 | 30 | 3 |
| 6 | 5 | 4 | 30 | 3 |

[a] Ignition properties are based on a scale of 1–10. One (1) represents no ignition; five (5) represents ignition occurring quietly and smoothly; ten (10) represents rapid ignition with rapid propogation of flame across substantially the entire surface of the slick.
[b] Burning qualities were determined on the basis of a 1–10 scale. One (1) represents extremely fitful burning with extinguishment shortly after ignition; five (5) represents quiescent burning of substantial duration; ten (10) represents extremely vigorous burning of long duration.
[c] Physical character of burned residuum were predicated on a 1–10 scale. One (1) represents substantially no change from the unburned oil slick; five (5) represents a marked thickening of the residuum as compared to the unburned oil; ten (10) represents a residuum having a brittle "coke-like" consistency. Ratings of between seven and ten indicate that the particular residuum is of a character suitable for physical removal thereof from the water surface.

Example 2

About 600 pounds of a No. 5 fuel oil are deposited on beach sand at below the high tide mark. Said oil is allowed to penetrate the sand for about one hour. Next, about 8 pounds of the same type of hydrophobic silica as employed in Series 6 and 7 of Example 1 is deposited relatively uniformly over substantially the entire surface of the oil spill. Ignition of the thusly treated oil is accomplished in a manner similar to that described in Example 1. The resulting flame propogates slowly and steadily across the entire surface of the oil spill and the combustion continues thereafter for about one-half hour. The burned and cooled residuum is frangible and is readily removed from the surface of the sand.

In a control experiment, where no treatment of the oil is accomplished, ignition of the oil is achieved only with great difficulty. Also, the combustion reaction does not propogate across the surface of the spill and does not continue for more than about one minute after each of several firings.

What is claimed is:
1. A process for treating oil spills which comprises:
   (a) applying to the spill at least about 0.01 percent by weight thereof of a finely-divided, particulate, substantially water and oil insoluble solid having an average ultimate particle diameter of less than about 250 m$\mu$, a BET-N$_2$ surface area of greater than about 10 m.$^2$/gram and an apparent density of less than about 50 lbs./ft.$^3$, and
   (b) igniting the resulting spill.
2. The process of claim 1 wherein the amount of said particulate solid applied to the spill represents at least about 0.5 weight percent thereof.
3. The process of claim 1 wherein said particulate solid has an oil absorption factor of at least about 100 ccs./gram and the amount thereof applied to the spill represents between about 2 and about 10 percent by weight thereof.
4. The process of claim 3, wherein, subsequent to the burning step, the residuum of the burned oil spill is physically removed from the work site.
5. The process of claim 1 wherein said particulate solid is hydrophobic.
6. The process of claim 5 wherein application of said hydrophobic solid to the oil spill is achieved by entrainment of said solid in a stream of water and the resulting water/solid stream is conveyed to the spill.
7. The process of claim 6 wherein the hydrophobic solid entrained in a stream of water is applied to the upper surface of the spill.
8. The process of claim 6 wherein the oil spill resides on a body of water and the hydrophobic solid entrained in a stream of water is applied to the lower surface of the spill.
9. The process of claim 1 wherein the particulate solid has an average ultimate particle diameter of less than about 100 m$\mu$, a BET-N$_2$ surface area of greater than about 50 m.$^2$/gram and an apparent density of less than about 15 lbs./ft.$^3$.
10. The process of claim 9 wherein the particulate solid is silica.
11. The process of claim 10 wherein said silica is rendered hydrophobic by treatment thereof with an organo-silicon compound.
12. The process of claim 1 wherein said solid is a mineral silicate.
13. The process of claim 12 wherein said mineral silicate is asbestos.
14. The process of claim 1 wherein said particulate solid is carbon black.

References Cited

UNITED STATES PATENTS

| | | | |
|---|---|---|---|
| 2,780,538 | 2/1957 | Chilton | 44—51X |
| 3,348,932 | 10/1967 | Kukin | 44—4 |

OTHER REFERENCES

Combating Oil Pollution, Petroleum Times, vol. 71, No. 1819, pp. 620, 625–28 (Apr. 28, 1967).

DANIEL E. WYMAN, Primary Examiner

W. J. SHINE, Assistant Examiner

U.S. Cl. X.R.

44—51; 210—40